Figure 1:
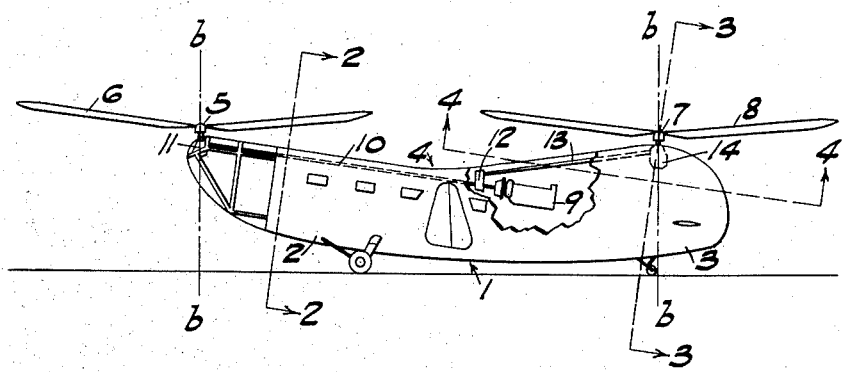

June 5, 1951   E. DALAND   2,555,577
TANDEM ROTOR HELICOPTER CONTROL
Filed Feb. 19, 1947   3 Sheets-Sheet 1

Inventor
Elliot Daland
By John D. Myers
Attorney

June 5, 1951 E. DALAND 2,555,577
TANDEM ROTOR HELICOPTER CONTROL
Filed Feb. 19, 1947 3 Sheets-Sheet 3

Inventor
Elliot Daland
By John W. Myers
Attorney

Patented June 5, 1951

2,555,577

UNITED STATES PATENT OFFICE 2,555,577

TANDEM ROTOR HELICOPTER CONTROL

Elliot Daland, Wallingford, Pa., assignor, by mesne assignments, to Piasecki Helicopter Corporation, Morton, Pa., a corporation of Pennsylvania Application February 19, 1947, Serial No. 729,565

30 Claims. (Cl. 244—17.23)

This invention relates generally to helicopters of the type supported in flight by two or more rotors mounted in tandem upon the fuselage, i. e., with at least one rotor forward and at least one rotor aft of the center of gravity of the aircraft, which helicopters are controlled in speed or direction by changing the angle of attack of the several rotor blades either simultaneously or selectively, throughout all or part of the circular path described by the blades. More particularly, the invention relates to control means for effecting any desired change in the angle of attack of the rotor blades, and to tandem rotor helicopters of novel design and improved flight characteristics provided with controls for facilitating the maneuvering thereof to assure utilization of such flight characteristics.

In all aircraft of the helicopter type the rotor blades are the principal means whereby changes in altitude, speed or direction may be made. Ordinarily, the blades describe a conical path when rotated under flight conditions about the rotor axis. When the axis of this cone is vertical the thrust of the blades is downward and proportional under most circumstances to the angle of attack of the blades. When the axis of the cone is tilted in any direction, there results a thrust vector in that direction the value of which increases as the angle through which the cone is tilted is increased. Tilting of the cone of rotation of the rotor blades may be accomplished either by tilting the actual rotative axis of the rotor, i. e., by actually tilting the entire rotor assembly, and leaving the blade pitch settings constant, or by maintaining the rotor axis fixed and progressively changing the pitch of blades so that all will rise higher on one side of the rotor than on the other. The latter method of tilting the cone of rotation of the blades has been found to be the more practical one, and is that employed in the helicopters of the present invention. The progressive change in pitch of the rotor blades, from a maximum on one side of the rotor axis to a minimum on the opposite side, is known as cyclic pitch, and is the means commonly used to control the flight of helicopters in which the axes of the rotor shafts are fixed relative to the fuselage. In such helicopters the actual axes of the rotors are the axes of the rotor shafts; the axes of the cones of rotation of the rotor blades are known in the art as the virtual axes of the rotors. The virtual axis of a rotor ordinarily may coincide with the actual axis thereof only when the blades of that rotor are not being cyclically changed in pitch.

Mechanism for changing the angle of attack of the rotor blades is well known, and in many installations comprises, as a principal part, a swash plate which surrounds the rotor shaft and is movable longitudinally of the shaft and tiltable in any direction with respect to the shaft. Such a swash plate mechanism is preferably employed in the present invention and it is sufficient here to state that any tilting movement of the swash plate, or any axial movement thereof with respect to the rotor shaft, will be accompanied by a corresponding change in the angle of attack of the rotor blades. An important part of the invention is concerned specifically with means for effecting the desired tilting, raising or lowering of the several swash plates.

An object of the invention is to provide manually operable means for changing the angle of attack of the rotor blades of a helicopter throughout any portion of the path described by their rotation.

Another object is to provide control means for helicopters which will accomplish the above stated object by permitting the pilot to tilt or move the swash plate axially relative to the rotor shaft in a rotor assembly.

An additional object is the provision of control means for tandem rotor helicopters by which the pilot may alter the position of the swash plates of both rotor assemblies simultaneously and in the same or opposite directions, thereby rendering it possible to maneuver the helicopter in any horizontal direction, as well as through any angle of ascent or descent.

It is a further object to provide a control system for tandem rotor helicopters incorporating means actuated by a single control member to control cyclically the pitch of the blades of both rotors in the same or opposite sense, to the same extent or differentially.

Still another object is to provide a control system for tandem rotor helicopters by which the collective or total pitch of both rotors may be differentially changed by a single control member, such total or collective pitch being superimposed on any cyclic pitch or differential cyclic pitch which may also have been introduced.

It is another object of the invention to provide a tandem rotor helicopter of novel and improved flight characteristics, having its rotor axes fixed relative to the fuselage vertical when in the hovering attitude and tilted forwardly when the helicopter is in forward flight attitude, and, further, to provide controls for such a helicopter whereby any desired attitude may be reached and maintained with a minimum of effort by the pilot.

Figure 2:
Figure 3:
Figure 4:

With the foregoing and other objects in view, the nature of which will become clear as the description proceeds, the invention will now be described in detail, reference being made to the drawings wherein one embodiment of the invention is illustrated, and wherein:

Fig. 1 shows in side elevation, with part of the fuselage wall broken away, a tandem rotor helicopter of a construction wherein my improved controls may be advantageously employed;

Figs. 2, 3 and 4 are sectional views of the fuselage alone, taken along lines 2—2, 3—3 and 4—4, respectively, of Fig. 1, in the direction of the arrows.

Figure 5:
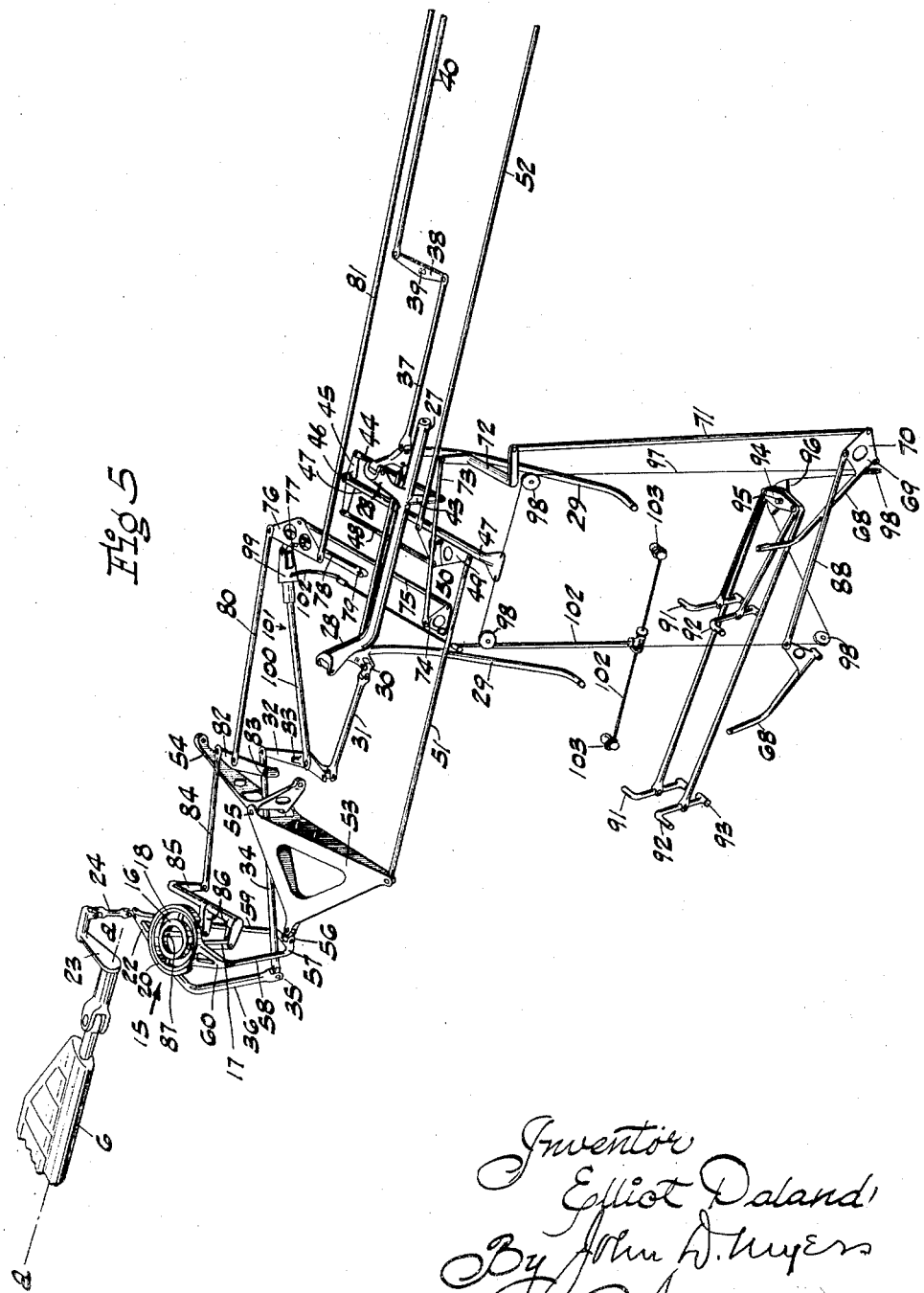
Figure 6:
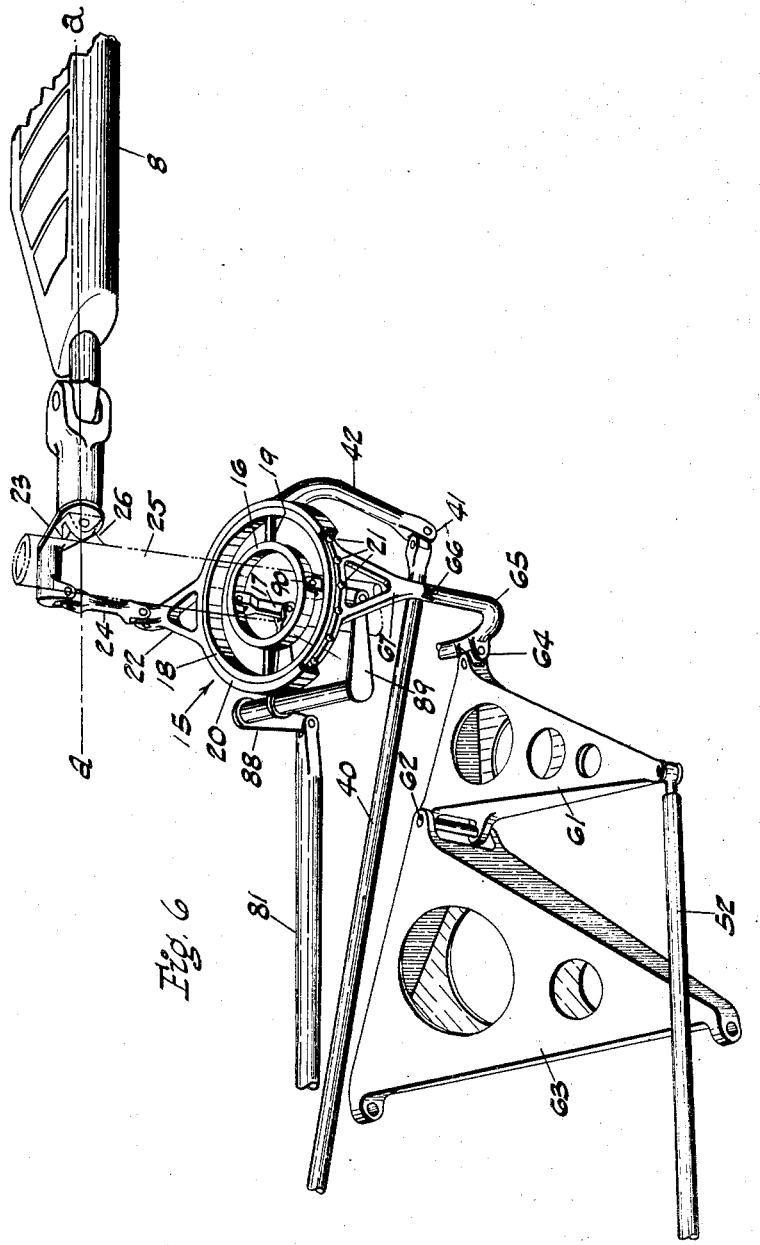

Fig. 5 is an isometric view of the forward rotor swash plate assembly and one form of controls therefor made in accordance with the present invention, and Fig. 6 is an isometric view on an enlarged scale, showing the aft rotor swash plate assembly and corresponding controls therefor.

As used herein, the term "cyclic pitch" denotes a progressive change in the angle of attack of any rotor blade from a maximum value at one point in its circular path to a lower value at a point 180° away and back again to its maximum value, the cycle being completed with each revolution of the blades. "Forward cyclic pitch" denotes an increase in pitch angles of the retreating blades and a decrease in the pitch angles of the advancing blades of the rotors. "Collective fore-and-aft cyclic pitch control action" is intended to designate the application of simultaneous changes in the cyclic pitch of both rotors such as to incline the lift vectors of both rotors in the same sense forwardly or rearwardly. "Collective pitch" denotes the average angle of attack of all blades of one rotor at any instant, and is not changed by superimposing cyclic pitch. "Differential collective pitch" denotes a difference in the collective pitch between the two rotors of a tandem rotor helicopter giving one rotor a greater lifting vector than the other, resulting in a moment about the pitch axis of the aircraft. The term "fore-and-aft mean differential pitch control action" is intended to designate the application of simultaneous and unequal or opposite changes in the mean, total, or collective pitch of the forward and aft rotors. "Differential cyclic pitch" denotes the tilting of the swash plates to tilt the lift vectors of the rotors in relatively opposite directions.

Referring now to Fig. 1, there is shown a tandem rotor helicopter comprising a fuselage indicated generally as 1 having a forward portion 2 and an aft portion 3 angularly related to each other to form a downwardly convergent obtuse angle 4 at their juncture. A rotor hub assembly 5 having blades 6 is mounted upon the forward portion 2 substantially at the end thereof, and a second rotor hub assembly 7 having blades 8 is similarly mounted upon the aft portion 3. The blades 6 and 8 may be articulated or rigid as desired, and are mounted at their roots to the rotor hubs 5 and 7, respectively, in any desired manner for rotation about their substantially longitudinal axes.

In the helicopters to which the present invention relates, the rotor shafts are so journaled in the fuselage that their axes $b$—$b$ are substantially parallel to each other and substantially vertical when the helicopter is at rest on the ground or in vertical or hovering flight attitude, as shown in Fig. 1. The axes of the rotor shafts are fixed with respect to the fuselage and may be tilted with respect to the true vertical only by changing the attitude of the entire fuselage. The forward portion of the fuselage is substantially oval in cross-section (Fig. 2), and this shape is substantially maintained rearwardly until the forward portion merges with the aft portion of the fuselage. The fuselage then progressively narrows as it extends rearwardly (Figs. 3 and 4) to provide airfoil qualities to the aft portion 12. The foregoing construction details are described and claimed in Patent No. 2,507,993, and thus, per se, do not form the basis of the present invention. The present invention embraces the combination of such helicopter construction with the improved controls herein described, and the controls per se, the benefits and advantages of which will be discussed fully hereinafter.

A power plant, such as a gasoline engine 9, drives the rotors in opposite directions, the power being transmitted to forward rotor 5 by a drive shaft 10 and a gear reduction unit 11, and to the aft rotor 7 by a gear box 12, a drive shaft 13 and a gear reduction unit 14. Associated with each rotor assembly 5 and 7 is a swash plate assembly, shown generally at 15, which cooperates with the blades 6 and 8 to control their pitch or angle of attack.

Referring now to Figs. 5 and 6 it will be seen that the swash plates are at the termini of the controls where they are coupled with the several rotor blades to regulate the pitch thereof at all points in the path described by them. The coupling between the swash plates and the rotor blades may be made in any well known manner and therefore one such coupling is shown only diagrammatically in Figs. 5 and 6.

Each of the swash plates comprises an inner ring 16 pivotally mounted for rotation about its transverse axis upon support portions 17 which in turn are pivotally supported by a member of the control system in a manner which will be described more fully hereinafter. A middle ring 18, concentric with the inner ring 16 when the rings are in the same plane, is pivotally attached to the inner ring for rotation about its fore and aft axis by means of pins or trunnions 19. The gimbaled joint so formed permits the ring 18 to be tilted in any direction any desired amount within the mechanical limits of the joint. An outer ring 20 is mounted outside of but in close proximity to middle ring 18. The rings 18 and 20 are maintained in permanent concentric relation but are movable with respect to each other about their common axis, ball bearings 21 being positioned at the interface of the rings to minimized friction between them. The outer ring is provided with a number of lugs 22, only one of which is shown, to which the roots of the rotor blades 6 and 8 are coupled by a crank arm 23 and a link 24, as shown diagrammatically in Figs. 5 and 6. Thus, any tilting of the outer ring 20 is accompanied by a corresponding rotation of the rotor blades 6 and 8 about their axes $a$—$a$ as the blades and ring rotate together under the influence of the rotor shaft which rotates within the inner ring. The pitch of the rotor blades is thereby cyclically changed. It is to be understood that the swash plate generally described above is but one of a number of well known designs, and that my helicopter controls may be used quite satisfactorily with such other pitch changing mechanisms. For example, in one other form of swash plate known in the art the inner ring 16 is the one adapted to rotate about its axis, while the outer ring 20 is pivotally mounted to the middle ring 18. My control system is equally adaptable to a swash plate of this design.

The functional and mechanical relationship between the rotor shaft, the rotor blades and the swash plate assembly is illustrated for the rear rotor assembly in Fig. 6, the rotor shaft and coupling being shown diagrammatically in broken line representation, and it will be understood that a similar arrangement may be used for the forward rotor assembly.

The rotor shaft 25 is positioned for rotation within the inner ring 16, sufficient clearance being allowed between these members to permit rotation of the inner ring about its transverse axis between the allowable limits necessary to effect the desired fore and aft tilting of the swash plate assembly. A coupling 26 connects the rotor shaft and the roots of the rotor blades. The coupling 26 is fixed to the shaft 25 for rotation therewith, but is connected by a pivotal connection (not shown) with the rotor blades to permit rotation of the latter about their longitudinal axes $a—a$ in response to the rise and fall of the lugs 22 as they rotate in a tilted plane relative to the rotor shaft.

Before proceeding with the description of the mechanical details of my helicopter controls, a brief introductory discussion of the component sub-assemblies and their operation will be given to assure a clear understanding of the manner in which they affect the course or speed of the aircraft. The entire assembly comprises four principal sub-assemblies; to wit, a roll and fore and aft flight control assembly to effect motion of the helicopter about its longitudinal axis as well as to control fore and aft flight; a turn control; an elevation control; and a trim control by means of which one swash plate may be raised somewhat more or less than the other, thereby introducing a differential lift vector between the two rotors. By means of the trim control either end of the helicopter may be caused to rise above the other, or level flight may be assured notwithstanding an uneven distribution of the load about the center of gravity of the aircraft. The several sub-assemblies will first be described individually, after which they will be discussed as a unitary assembly when the effect of each sub-assembly on the flight of the aircraft as well as their influence upon one another will be clearly set forth.

Considering first the roll and fore and aft flight control assembly, it will be seen from Figs. 5 and 6 that this mechanism comprises a yoke 27 pivotally mounted upon any rigid portion of the fuselage (not shown), the axis of the yoke being substantially parallel to the longitudinal axis of the fuselage. In the embodiment of my invention illustrated in Fig. 5, dual controls are shown. Such an arrangement is purely arbitrary, as will be readily understood, and, since the mechanical construction and function of the several corresponding members are identical, only one of each will be described herein.

The yoke 27 is provided with an upwardly extending arm 28 having a bifurcated free end in which is pivotally mounted one end of a column 29, the column being adapted to swing in a fore and aft direction. The column 29 is connected, a short distance below its point of suspension, by a universal joint 30 to a forwardly extending link 31 which is pivotally connected at its forward end to one end of a reversing lever 32 fulcrumed near its center on _____ 33 carried by a rigid portion of the fuselage (not shown).

The other end of lever 32 is pivotally attached to one end of a link 34, the other end of which is connected by a universal joint 35 to an upwardly extending arm 36 secured at its upper end to the middle ring 18 substantially in line with its fore and aft axis. Thus, it can be seen, that a forward movement of the column 29 results in tilting the swash plate forwardly, changing the angle of attack of the rotor blades 6 cyclically to tilt the virtual axis of the rotor forwardly. Due to the inertia lag in articulated blades which delays the rise and fall of the blades following changes in pitch, and in order to cause the cone of rotation of such articulated blades to be tilted in the same direction as the swash plate, the blades are coupled to the swash plates 90° behind the longitudinal axes of the blades, as shown in Figs. 5 and 6. This is done for convenience only and is not considered a feature of the invention. Rigid blades when rigidly attached to the rotor need not be so positioned on the swash plate, since they are not characterized by such inertia lag.

Tilting of the rear swash plate in the same direction is effected by a similar system of levers and links to that described immediately above. The column 29 is pivotally connected to a rearwardly extending link 37, the aftermost end of which is pivotally attached to one end of a reversing lever 38 fulcrumed substantially at its center on a vertical pin 39 carried by the fuselage (not shown). Pivotally attached to the other end of the lever 38 is a link 40 extending rearwardly to a point below the rear swash plate assembly where it is connected by a universal joint 41 to an upwardly extending arm 42 which is fixed at its upper end to the aftermost part of the middle ring 18 of the rear swash plate assembly 15. It can be seen, then, that movement of the control column 29 in a fore and aft direction will be accompanied by a tilting of both swash plates in the same direction about their transverse axes and that the degree of tilting will be proportional to the angular distance through which the column is moved.

The yoke 27 is provided with a downwardly extending arm 43, to the lowermost end of which is pivotally attached a link 44 disposed transversely of the aircraft. The other end of link 44 is pivotally mounted upon a reversing lever 45 fulcrumed on a vertical pin 46, which pin also carries a transversely disposed support 47, the lever 45 and support 47 being independently movable on pin 46. The other end of lever 45 is pivotally connected to one end of a link 48, the other end of which is pivotally connected to one arm of a triple-throw crank 49 having, in addition to this arm, a pair of opposed crank arms. The crank 49 is fulcrumed on a pin 50 substantially midway between the opposed crank arms, as shown, the pin 50 being carried by the support 47. The opposed crank arms are disposed transversely of the fuselage and are adapted to oscillate through a limited distance to impart fore and aft motion to links 51 and 52 to which they are pivotally connected. It can be seen by inspection that rotation of the crank 49 will cause links 51 and 52 to move equal distances but in opposite fore and aft directions.

The link 51 is pivotally connected at its other end to a bell crank 53 fulcrumed on a support 54 by pin 55. The other arm of bell crank 53 is connected by a universal joint 56 to the cross member of a substantially U-shaped link 57 the branches 58 and 59 of which are pivotally connected to lugs 60 integral with the middle ring 18 of the swash plate 15. The pivotal connection with the branches 58, 59 and lugs 60 provides a transverse axis about which the swash plate assembly may be rotated.

The other end of link 52 is pivotally attached to one arm of a bell crank 61 fulcrumed on a pin 62 carried by a support 63. The other arm of the crank 61 is connected by a universal joint 64 to the middle ring of the aftermost swash plate 15 through a U-shaped link 65 pivotally attached by transversely disposed pins 66 to lugs 67 in substantially the same manner as described above for the forward swash plate 15.

The elevator control comprises a lever 68 fulcrumed on a horizontal pin 69, having a crank arm 70. A link 71 is pivotally attached at one end to the crank 70 and at the other end to a bell crank 72 which is connected through articulated link 73, bell crank 74 and articulated link 75 to a triple-throw crank 76. Crank 76 is fulcrumed on a pin 77 carried by a support 78 mounted on a vertical pin 79 for oscillation in a fore and aft direction. The opposed arms of crank 76 are pivotally attached to links 80 and 81 extending fore and aft and it can be seen by inspection that rotation of crank 76 about its fulcrum 77 will cause the links 80 and 81 to move equal distances fore and aft but in opposite directions. The link 80 is pivotally connected at its forward end substantially at the midpoint of a lever 82 fulcrumed at one end on a vertical pin 83 carried by the fuselage and pivotally connected at its opposite end to a forwardly disposed link 84. The forward end of link 84 is pivotally attached to a bell crank 85 having two substantially parallel arms 86 projecting therefrom substantially horizontally forwardly, the ends of said arms being pivotally connected to the lower ends of support 17 for the inner-ring 16 of the forward swash plate. The arms of support 17 are disposed substantially vertically and are connected to the inner-ring 16 by means of transverse pins 87 to permit the swash plate assembly to rotate about a transverse axis.

The link 81 extends rearwardly of the aircraft and is pivotally mounted at its rearmost end to a bell crank 88 of similar construction to crank 85 above described. The arms 89 of the crank 88 project substantially horizontally rearwardly and are pivotally connected at their aftermost ends to the upwardly extending supports 17, the upper ends of which are pivotally connected to inner-ring 16 of the after swash plate by means of pins 90 disposed transversely of the swash plate assembly.

The turn control comprises a pair of pedals 91 and 92 fulcrumed on the fuselage by means of pins 93 and pivotally connected to a lever 94 fulcrumed on a vertical pin 95 carried by the fuselage. A sector 96 of a pulley is fixed to the lever 94 and rotates therewith in response to a differential pressure applied between the pedals 91, 92. A control cable 97 is threaded tautly through the pulley sector 96 and through a generally quadrangularly shaped pulley system comprising pulleys 98 and connected at its free ends to opposite sides of the free end of the support 47.

The trim control comprises a screw-jack 99 having an extension 100 which combine to form a rigid link member 101 of variable length. This link member is pivotally connected at one end to the lever 32 at a point intermediate the pin 33 and the connection for link 31, and at the other end to the free end of the support 78. A flexible shaft 102 for actuating the screw-jack 99 connects the screw-jack with the manual control knobs 103 in the pilot's compartment. Thus, for any position of the fore and aft control members, as determined by the pilot's adjustment of control column 29, it is possible to move links 80 and 81 in the same fore and aft direction, and thereby to cause a differential vertical lift between the rotors, by manipulating control knobs 103 to change the length of link 101 and move support 78 in a fore and aft direction about its pivot 79.

In discussing the operation of the mechanical parts of my invention, let it be assumed that the controls described above are incorporated in a helicopter of the type shown in Fig. 1 and that the aircraft is at rest on the ground with the rotors in motion but with the pitch of the blades too low to cause the helicopter to rise. To start a vertical ascent, the pilot pulls lever 68 backward (clockwise in Fig. 5). This motion is transmitted by the articulated coupling of links, cranks and levers (as shown) to the bell cranks 85 and 88 supporting the forward and rear swash plates, respectively. By following this motion through the various members of the articulated coupling, it will be seen that backward movement of lever 68 will cause both swash plates to descend and thereby to increase the collective pitch of the blades of both rotors by an equal amount. The helicopter will now rise until the collective pitch is reduced by moving lever 68 in the opposite direction.

Having gained the desired altitude by this means, the pilot may cause the helicopter to move laterally by moving the control column 29 laterally in the proper direction. Movement of column 29 to the right, for example, will cause both swash plates to tilt to the right, cyclically changing the pitch of all the rotor blades so that their cone of rotation will be tilted to the right with a resultant horizontal component in that direction. Turns are effected by a differential cyclic pitch of the blades of the two rotors so that the cone of rotation of one is tilted more than the other, or so that the cones are tilted in opposite athwartship directions. To accomplish turns, therefore, the pilot depresses one of the pedals 91, 92. Assuming pedal 91 is depressed, inspection of Figs. 5 and 6 will disclose that pulley sector 96 is rotated counterclockwise, moving the cable 97 in that direction. Support 47 is thus moved rearwardly, carrying with it crank 49 and links 51 and 52. Movement of link 51 rearwardly causes the forward swash plate to tilt to the right; rearward movement of link 52 causes the aft swash plate to tilt to the left. The lateral thrusts of the two rotors are thus made unequal, regardless of any athwartship cyclic pitch introduced by a lateral setting of control column 29, and a moment about a vertical line through the center of gravity of the helicopter is created.

For forward or rearward movement of the helicopter the control column 29 is moved in a fore and aft plane in the proper direction. Forward movement of column 29 is transmitted to both swash plates equally, the effect being to tilt them forwardly. The helicopter to which the present controls are best adaptable, however, i. e., that depicted in Fig. 1, is most economically flown with the forward portion 2 substantially horizontal and the aft portion 3 extending upwardly and rearwardly therefrom. The airfoil qualities of the aft portion then serve as a vertical stabilizer to prevent undue motion of the aircraft about its yaw-axis. Also, with the helicopter in a tail-high attitude in forward flight, the rotative axes of the rotors are tilted forwardly so that a forward component is obtained from the rotor blades without the use of cyclic pitch. An additional advantage which flows directly from the helicopter construction shown in Fig. 1 is that, when flown forward in a tail-high attitude, the aft rotor is above the plane of the forward rotor and therefore is not affected by the turbulent air created by the forward rotor. The present controls permit the pilot to bring the helicopter to the desired forward flight attitude, and to maintain such attitude, with a minimum of effort, and by manipulating only one control member. It will be noted that the link 101 joins a portion of the control system (lever 32), which governs longitudinal flight, with the support 78 for the crank 76 which governs the collective pitch of both rotors. By moving control column 29 forward, for forward flight, not only are both swash plates tilted forwardly, but, since link 101 at the same time displaces support 78 and crank 76 forwardly, the collective pitch of the forward rotor is somewhat reduced while that of the aft rotor is correspondingly increased. Thus, the helicopter automatically assumes the proper forward flight attitude in response to movement by the pilot of a single manual control. When this flight attitude is reached, the pilot brings the control column to substantially neutral position and may further regulate his forward speed by collective pitch changes in both rotors, the use of cyclic pitch being unnecessary.

Where the pilot desires to maintain differential collective pitch between the rotors, as where there is an uneven load distribution about the center of gravity of the helicopter, he may do so by manipulating control knobs 103 in the cockpit. This lengthens or shortens the link 101 through operation of the screw-jack 99, and moves the support 78 and crank 76 forwardly or rearwardly until the proper differential collective pitch is obtained.

The present invention, therefore, provides a novel control system for helicopters which permits, with a minimum of manipulation by the pilot, the application to the rotor blades of collective pitch, cyclic pitch to yield a horizontal thrust in any direction, differential collective pitch to raise either end of the helicopter above the other, and differential cyclic pitch for turn control. Additionally, the present controls provide for automatic application of differential collective pitch when cyclic pitch for fore and aft flight is introduced, and for the addition or subtraction of differential collective pitch independently of that automatically introduced. The present invention also provides a novel combination of a helicopter and controls therefor whereby the advantageous flight properties of the helicopter inherent in a particular attitude when in forward flight are automatically realized when the control for simple forward translation is actuated.

It will be understood that the foregoing description is only illustrative of my invention and that modifications may be made therein without departing from the spirit of the invention. Therefore, it is not intended that the invention be confined to the specific details set forth herein, but that it embrace any changes and modifications readily occurring to those skilled in the art, limited only as indicated in the appended claims.

What I desire to claim is:

1. In a helicopter, in combination, a fuselage having forward and aft portions angularly related to form a downwardly convergent obtuse angle at their juncture, said aft portion progressively decreasing in transverse dimension rearwardly, a rotor carried by each of said portions above and adjacent the free end thereof, said rotors each comprising a rotatable shaft and a plurality of airfoil blades coupled to said shaft and rotatable therewith, a swash plate associated with each of said rotors and movable longitudinally of and tiltable in any direction with respect to said shaft, the actual axes of said rotors being fixed with respect to said fuselage and vertical when the helicopter is in hovering attitude, the blades of said rotors being connected to the respective swash plates and rotatable about their substantially longitudinal axes in response to changes in position of the swash plate relative to said shaft, said blades of each rotor when rotated defining a cone of rotation about said shaft, the axis of said cone being angularly related to said rotor axis when cyclic changes in pitch are applied to said blades, said swash plates being related to the blades of their respective rotors to change the collective pitch thereof upon movement of said swash plates longitudinally of said shafts and to transmit any tilting of said swash plates to the respective axes of said cones in the same direction, means for tilting said swash plates equally in the same direction about their transverse axes, means coupled with said first mentioned means for tilting said swash plates equally in the same direction about their fore and aft axes, means for moving said swash plates longitudinally of said shafts an equal distance in the same direction, means coupling said first mentioned means with said third mentioned means for moving said swash plates longitudinally of said shafts an equal distance in opposite directions, said fourth mentioned means responsive to actuation of first mentioned means, and means coupled with said second mentioned means for tilting said swash plates about their fore and aft axes an equal amount in opposite directions.

2. A helicopter in accordance with claim 1 wherein said first mentioned means comprises a control column universally supported in the helicopter for oscillation longitudinally and transversely thereof, a substantially vertical arm rigidly carried by each of said swash plates substantially on the fore and aft axis thereof, and an articulated coupling connecting the free end of each of said arms to said control column, said coupling adapted when the control column is displaced in a fore and aft direction to move said vertical arm in like direction and thereby to rotate said swash plates an equal amount in the same direction about their transverse axes proportional to the displacement of said control column.

3. A helicopter in accordance with claim 1 wherein said second mentioned means comprises a control column universally supported in the helicopter for oscillation longitudinally and transversely thereof, a bifurcated arm spanning each of said swash plates and pivotally connected thereto substantially on the transverse axis thereof, and an articulated coupling connecting the free end of each of said bifurcated arms to said control column, said articulated coupling adapted when said control column is displaced transversely to move said bifurcated arms in like direction and thereby to rotate said swash plates an equal amount in the same direction about their fore and aft axes, the extent of rotation of said swash plates being proportional to the displacement of said control column.

4. A helicopter in accordance with claim 1 wherein said third mentioned means comprises a support for each of said swash plates, a manual control lever, and an articulated coupling connecting each of said supports to said control lever, said articulated coupling adapted in response to displacement of said control lever to move said supports equal distances in the same direction longitudinally of said shafts, such movement of said supports being proportional to the displacement of said control lever.

5. A helicopter in accordance with claim 1 wherein said second mentioned means comprises a control column universally supported in the helicopter for oscillation longitudinally and transversely thereof, a bifurcated arm spanning each of said swash plates and pivotally connected thereto substantially on the transverse axis thereof, a rotatable control member movable a limited distance longitudinally of said helicopter and connected to each of said bifurcated arms in such a way that rotation of said member causes both of said bifurcated arms to move in like transverse direction to rotate said swash plates equally in one direction and movement of said member longitudinally of said helicopter causes said bifurcated arms to move transversely differentially with respect to the longitudinal axis of said helicopter to rotate said swash plates an equal amount in opposite directions about their fore and aft axes, and an articulated coupling connecting said control column with said control member, and wherein said fifth mentioned means comprises a support for said control member, said support movable a limited distance longitudinally of said helicopter, and pedal control means operatively connected to said support for moving the latter longitudinally of said helicopter, whereby a turning moment and a force for lateral translation of said helicopter may be simultaneously applied to said helicopter.

6. In a helicopter, in combination, a fuselage having forward and aft portions angularly related to form a downwardly convergent obtuse angle at their juncture, said aft portion progressively decreasing in transverse dimension rearwardly, a rotor carried by each of said portions above and adjacent the free end thereof, said rotors each comprising a rotatable shaft and a plurality of airfoil blades coupled to said shaft and rotatable therewith, a swash plate associated with each of said rotors and movable longitudinally of and tiltable in any direction with respect to said shaft, the actual axes of said rotors being fixed with respect to said fuselage and vertical when the helicopter is in hovering attitude, the blades of said rotors being connected to the respective swash plates and rotatable about their substantially longitudinal axes in response to changes in position of the swash plates relative to said shafts, said blades of each rotor when rotated defining a cone of rotation about the shaft of said rotor, the axes of said cones being angularly related to said rotor axes when cyclic changes in pitch are applied to said blades, said swash plates being related to the blades of their respective rotors to change the collective pitch thereof upon movement of said swash plates longitudinally of said shafts and to transmit any tilting of said swash plates to the respective axes of said cones in the same direction, and means actuated by a single pilot control member for tilting said swash plates equally in the same direction about their transverse axes and for simultaneously moving said swash plates longitudinally of their respective rotor shafts an equal distance in opposite directions.

7. A helicopter in accordance with claim 6 including trim means coupled with but operable independently of said first mentioned means for moving said swash plates longitudinally of their respective rotor shafts an equal distance in opposite directions in addition to such movement of said swash plates by said first mentioned means, said trim means being actuated by a pilot control member independent of said first mentioned pilot control member.

8. A helicopter in accordance with claim 6 including means coupled with but operable independently of said first mentioned means for moving said swash plates longitudinally of their respective rotor shafts an equal distance in the same direction in addition to such longitudinal movement of said swash plates by said first mentioned means, said second mentioned means being actuated by a pilot control member independent of said first mentioned pilot control member.

9. A control system for tandem rotor helicopters comprising means associated with the rotors for collectively changing the pitch of the blades thereof, means associated with the rotors for cyclically varying the pitch of said blades thereof, a pilot actuated control column operatively connected with said cyclic control means, said cyclic control means being interconnected with said collective pitch control means whereby movement of said control column to introduce cyclic pitch to the rotors for forward translation of the helicopter simultaneously decreases the collective pitch of the blades of the front rotor and increases the collective pitch of the blades of the rear rotor.

10. A helicopter comprising, in combination, a fuselage, a rotor carried by said fuselage above and adjacent each end thereof, said rotors each comprising a rotatable shaft and a plurality of blades coupled to said shaft, said blades being individually changeable in pitch and describing substantially a cone when rotated about said shaft, the actual axes of said rotors being fixed with respect to said fuselage and vertical when the helicopter is in hovering attitude, said rotors each having a virtual axis coinciding with said actual axis when the pitch of said blades remains constant but tiltable relative thereto in any direction in response to cyclic changes in pitch of said rotor blades, means associated with said rotors for tilting the virtual axes thereof equally and in the same fore and aft direction relative to said actual axes, and means associated with said rotors for changing the collective pitch of the blades of one rotor with respect to the blades of the other rotor, both of said means being coupled together so that when said virtual axes are tilted in like fore and aft direction relative to said actual axes the collective pitch of the blades of one rotor is increased and the collective pitch of the blades of the other rotor is decreased.

11. A helicopter having a fuselage with rotors mounted substantially on the forward and aft ends thereof, means associated with said rotors for cyclically changing the pitch of said rotor blades to produce a component for translation of said helicopter in a fore and aft direction, means associated with said rotors for collectively changing the pitch of said rotor blades, and a single pilot control member connected to both of said pitch changing means so that when said pilot control member is actuated to cyclically change the pitch of said rotor blades for translation of said helicopter in a fore and aft direction the collective pitch of the blades of one of said rotors is simultaneously increased while the collective pitch of the blades of the other of said rotors is decreased.

12. A helicopter in accordance with claim 11 wherein said first mentioned means is operative also to cyclically change the pitch of said rotor blades to produce a component for translation of said helicopter in an athwartships direction, said pilot control member being independently coupled to said first mentioned means so that said pilot control member may be actuated to produce only cyclic changes in pitch of said rotor blades for translation of said helicopter in an athwartships direction.

13. The helicopter in accordance with claim 12 including a pilot pedal control member connected to said first mentioned means for cyclically changing the pitch of the blades of said rotors respectively in like amount but in opposite sense in an athwartships direction, whereby a turning moment is produced in said helicopter, said pedal control member being operatively coupled to said independent coupling between said first mentioned pilot control member and said first mentioned means for independent actuation of said first mentioned means, whereby any cyclic pitch introduced by actuation of said pedal control member is superimposed upon the cyclic pitch introduced by actuation of said first mentioned pilot control member.

14. The helicopter in accordance with claim 13 including a third pilot control member connected to said second mentioned means for simultaneously changing the collective pitch of the blades of both rotors in the same sense and to the same extent, said third pilot control member being operatively coupled to said connection between said first mentioned pilot control member and said second mentioned means for independent actuation of said second mentioned means, whereby any collective pitch introduced by actuation of said third pilot control member is superimposed upon the collective pitch introduced by actuation of said first mentioned pilot control member.

15. A helicopter in accordance with claim 11 including a second pilot control member connected with said second mentioned means for changing the collective pitch of the blades of one of said rotors with respect to the blades of the other of said rotors, whereby a couple for rotation of said helicopter about its pitch axis is produced, said second pilot control member being operatively coupled to said connection between said first mentioned pilot control member and said second mentioned means for independent actuation of said second mentioned means, whereby any differential collective pitch introduced to said rotor blades by actuation of said second pilot control member is superimposed upon the differential colective pitch introduced to said rotor blades by actuation of said first mentioned pilot control member.

16. A control system for tandem rotor helicopters comprising means associated with the rotors for collectively increasing and decreasing the pitch settings of the rotor blades to vary the lift thereof, means for cyclically varying the pitch settings of said blades to tilt the virtual axes of the rotors, pilot control means operatively connected with said first mentioned means for varying the lift of both of said rotors by an equal amount in the same sense, second pilot control means operatively connected with said second mentioned means for tilting the virtual axes of both rotors an equal amount in the same direction, and third pilot control means operatively connected to said second mentioned means for tilting the virtual axes of said rotors an equal amount but in opposite directions, said first mentioned pilot control means and said second pilot control means being so coupled together that when said second pilot control means is actuated to tilt the virtual axes of said rotors in a fore and aft direction the lift of one of said rotors is increased and the lift of the other of said rotors is decreased.

17. A tandem rotor helicopter comprising a fuselage, a rotor carried by said fuselage above and adjacent each end thereof, said rotors each comprising a rotatable shaft and a plurality of airfoil blades coupled to said shaft and rotatable therewith, a swash plate associated with each of said rotors and movable longitudinally of and tiltable in any direction with respect to said shaft, the actual axes of said rotors being fixed with respect to said fuselage, the blades of said rotors being connected to the respective swash plates and rotatable about their substantially longitudinal axes in response to changes in position of the swash plates relative to said shafts, said blades of each rotor when rotated defining a cone of rotation about said shaft, the axes of said cones being angularly related to said rotor axes when cyclic changes in pitch are applied to said blades, said swash plates being related to the blades of their respective rotors to change the collective pitch thereof upon movement of said swash plates longitudinally of said shafts and to transmit any tilting of said swash plates to the respective axes of said cones in the same direction, means for tilting said swash plates equally in the same direction about their trnasverse axes, means coupled with said first mentioned means for tilting said swash plates equally in the same direction about their fore and aft axes, means for moving said swash plates longitudinally of said shafts an equal distance in like direction, means coupling said first mentioned means with said third mentioned means for moving said swash plates longitudinally of said shafts an equal distance in opposite directions, said fourth mentioned means being responsive to actuation of said first mentioned means, and means coupled with said second mentioned means for tilting said swash plates about their fore and aft axes in equal amount in opposite directions.

18. A helicopter in accordance with claim 17 wherein said first mentioned means comprises a control column universally supported in the helicopter for oscillation longitudinally and transversely thereof, a substantially vertical arm rigidly carried by each of said swash plates substantially on the fore and aft axis thereof, and an articulated coupling connecting the free end of each of said arms to said control column, said couplings being adapted when the control column is displaced in a fore and aft direction to move said vertical arms in like direction and thereby to rotate said swash plates equal amounts in the same direction about their transverse axes proportional to the displacement of said control column.

19. A helicopter in accordance with claim 17 wherein said second mentioned means comprises a control column universally supported in the helicopter for oscillation longitudinally and transversely thereof, a bifurcated arm spanning each of said swash plates and pivotally connected thereto substantially on the transverse axes thereof, and an articulated coupling connecting the free end of each of said bifurcated arms to said control column, said articulated couplings being adapted when said control column is displaced transversely to move said bifurcated arms in like direction and thereby to rotate said swash plates equal amounts in the same direction about their fore and aft axes, the extent of rotation of said swash plates being proportional to the displacement of said control column.

20. A helicopter in accordance with claim 17 wherein said third mentioned means comprises a support for each of said swash plates, a manual control lever, and an articulated coupling connecting each of said supports to said control lever, said articulated couplings being adapted in response to displacement of said control lever to move said supports equal distances in the same direction longitudinally of said shafts, such movement of said supports being proportional to the displacement of said control lever.

21. A helicopter in accordance with claim 17 wherein said second mentioned means comprises a control column universally supported in the helicopter for oscillation longitudinally and transversely thereof, a bifurcated arm spanning each of said swash plates and pivotally connected thereto substantially on the transverse axes thereof, a rotatable control member movable a limited distance longitudinally of said helicopter and connected to each of said bifurcated arms in such a way that rotation of said member causes both of said bifurcated arms to move in like transverse direction to rotate said swash plates equally in one direction and movement of said member longitudinally of said helicopter causes said bifurcated arms to move transversely differentially with respect to the longitudinal axis of said helicopter to rotate said swash plates equal amounts in opposite directions about their fore and aft axes, and an articulated coupling connecting said control column with said control member, and wherein said fifth mentioned means comprises a support for said control member, said support being movable a limited distance longitudinally of said helicopter, and pedal control means operatively connected to said support for moving the latter longitudinally of said helicopter, whereby a turning moment and a force for lateral translation of said helicopter may be simultaneously applied to said helicopter.

22. A tandem rotor helicopter comprising a fuselage, a rotor carried by said fuselage above and adjacent each end thereof, said rotors each comprising a rotatable shaft and a plurality of airfoil blades coupled to said shaft and rotatable therewith, a swash plate associated with each of said rotors and movable longitudinally of and tiltable in any direction with respect to said shafts, the actual axes of said rotors being fixed with respect to said fuselage, the blades of said rotors being connected to the respective swash plates and rotatable about their substantially longitudinal axes in response to changes in position of the swash plates relative to said shafts, said blades of each rotor when rotated defining a cone of rotation about said shaft, the axes of said cones being angularly related to said rotor axes when cyclic changes in pitch are applied to said blades, said swash plates being related to the blades of their respective rotors so that movement of said swash plates longitudinally of said shafts will change the collective pitch of the respective rotors and tilting of said swash plates with respect to said shafts will cause the said cones of rotation respectively to tilt in a predetermined direction related to the direction in which said swash plates are tilted, means for tilting said swash plates so as to tilt the axes of said cones equally in like fore and aft direction, means coupled with said first mentioned means for tilting said swash plates so as to tilt the axes of said cones equally in like transverse direction, means for moving said swash plates longitudinally of said shafts so as to change the collective pitch of the respective rotors by equal amounts in like sense, means coupling said first mentioned means with said third mentioned means for moving said swash plates longitudinally of said shafts so as to change the collective pitch of the respective rotors by equal amounts in opposite sense, said fourth mentioned means being responsive to actuation of said first mentioned means, and means coupled with said second mentioned means for tilting said swash plates so as to tilt the axes of said cones equally in opposite transverse direction.

23. A helicopter in accordance with claim 22 wherein said first mentioned means comprises a control column universally supported in the helicopter for oscillation longitudinally and transversely thereof, a substantially vertical arm rigidly carried by each of said swash plates substantially on the fore and aft axis thereof, and an articulated coupling connecting the free end of each of said arms to said control column, said couplings being adapted when the control column is displaced in a fore and aft direction to move said vertical arms in like direction and thereby to rotate said swash plates equal amounts in the same direction about their transverse axes proportional to the displacement of said control column.

24. A helicopter in accordance with claim 22 wherein said second mentioned means comprises a control column universally supported in the helicopter for oscillation longitudinally and transversely thereof, a bifurcated arm spanning each of said swash plates and pivotally connected thereto substantially on the transverse axes thereof, and an articulated coupling connecting the free end of each of said bifurcated arms to said control column, said articulated couplings being adapted when said control column is displaced transversely to move said bifurcated arms in like direction and thereby to rotate said swash plates equal amounts in the same direction about their fore and aft axes, the extent of rotation of said swash plates being proportional to the displacement of said control column.

25. A helicopter in accordance with claim 22 wherein said third mentioned means comprises a support for each of said swash plates, a manual control lever, and an articulated coupling connecting each of said supports to said control lever, said articulated couplings being adapted in response to displacement of said control lever to move said supports equal distances in the same direction longitudinally of said shafts, such movement of said supports being proportional to the displacement of said control lever.

26. A helicopter in accordance with claim 22 wherein said second mentioned means comprises a control column universally supported in the helicopter for oscillation longitudinally and transversely thereof, a bifurcated arm spanning each of said swash plates and pivotally connected thereto substantially on the transverse axes thereof, a rotatable control member movable a limited distance longitudinally of said helicopter and connected to each of said bifurcated arms in such a way that rotation of said member causes both of said bifurcated arms to move in like transverse direction to rotate said swash plates equally in one direction and movement of said member longitudinally of said helicopter causes said bifurcated arms to move transversely differentially with respect to the longitudinal axis of said helicopter to rotate said swash plates equal amounts in opposite directions about their fore and aft axes, and an articulated coupling connecting said control column with said control member, and wherein said fifth mentioned means comprises a support for said control member, said support being movable a limited distance longitudinally of said helicopter, and pedal control means operatively connected to said support for moving the latter longitudinally of said helicopter, whereby a turning moment and a force for lateral translation of said helicopter may be simultaneously applied to said helicopter.

27. In a helicopter comprising a fuselage and a pair of rotors mounted in tandem relation on said fuselage, the actual axes of said rotors being fixed with respect to said fuselage, said rotors having virtual axes coinciding with said actual axes when the pitch of the blades of said rotors remains constant but tiltable in any direction in response to cyclic changes in pitch of said rotor blades, a control therefor comprising means for collectively changing the pitch of the blades of said rotors, means for tilting the virtual axes of said rotors in any direction with respect to the actual axes thereof, a single pilot control member operatively coupled to both of said means in such a way that movement of said pilot control member in a fore and aft direction changes the collective pitch of one of said rotors with respect to the other of said rotors, and movement of said pilot control member in an athwartships direction tilts the virtual axes of said rotors in the same athwartships direction, and a second pilot control member comprising a pair of pedal portions adapted to be actuated by the feet of the pilot, said second pilot control member being coupled to said second mentioned means so that actuation by the pilot of one of said pedal portions will tilt the virtual axis of the forward rotor to the right and tilt the virtual axis of the aft rotor to the left, and actuation by the pilot of the other of said pedal portions will tilt the virtual axis of the forward rotor to the left and tilt the virtual axis of the aft rotor to the right, said tilting of the virtual axes of said rotors by actuation of said second pilot control member being independent of any tilting of said virtual axes by actuation of said first mentioned pilot control member.

28. The helicopter control in accordance with claim 27 including a third pilot control member coupled to said first mentioned means for collectively changing the pitch of the blades of both of said rotors in equal amount and in the same sense independently of any collective change in pitch of said rotor blades by actuation of said first mentioned pilot control member.

29. The helicopter control in accordance with claim 28 including trim means coupled with but operable independently of said first mentioned means for changing the collective pitch of the blades of one of said rotors with respect to the blades of the other of said rotors, said trim means being actuated by a fourth pilot control member independent of said first mentioned pilot control member.

30. For a rotor-equipped aircraft having sustaining-bladed rotors forming rotor systems arranged in tandem as herein defined, a control system comprising blade pitch control elements adapted for coupling to said rotor systems, a movably mounted common control member for operating upon said rotor systems, and control connections between said member and said elements constructed to simultaneously apply thereto, upon movement of said member, fore-and-aft mean differential pitch control action and collective fore-and-aft cyclic pitch control action, said connections and control elements being further formed and disposed so that actuation of said control member in a direction for decreasing the mean pitch angle of the forward rotor system and increasing the mean pitch angle of the rear rotor system effects increase of the pitch angles of the retreating blades and decrease of the pitch angles of the advancing blades of the rotors of said systems.

ELLIOT DALAND.

REFERENCES CITED

The following references are of record in the file of this patent:

UNITED STATES PATENTS

| Number | Name | Date |
|---|---|---|
| 1,350,982 | Beurrier | Aug. 24, 1920 |
| 1,783,011 | Florine | Nov. 25, 1930 |

FOREIGN PATENTS

| Number | Country | Date |
|---|---|---|
| 155,974 | Switzerland | Oct. 1, 1932 |